(12) United States Patent
Peters

(10) Patent No.: US 9,046,027 B2
(45) Date of Patent: Jun. 2, 2015

(54) SYSTEMS AND METHODS FOR A HYDRAULICALLY ACTUATED VALVE

(75) Inventor: Eric David Peters, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 263 days.

(21) Appl. No.: 13/594,090

(22) Filed: Aug. 24, 2012

(65) Prior Publication Data

US 2014/0053548 A1   Feb. 27, 2014

(51) Int. Cl.
 *F02D 23/00* (2006.01)
 *F01N 11/00* (2006.01)
 *F02B 29/04* (2006.01)
 *F02M 25/07* (2006.01)

(52) U.S. Cl.
 CPC ........... *F01N 11/005* (2013.01); *F02B 29/0406* (2013.01); *F02M 25/0707* (2013.01); *F02M 25/0713* (2013.01); *F02M 25/0728* (2013.01); *F02M 25/0731* (2013.01); *F02M 25/0779* (2013.01); *Y02T 10/121* (2013.01); *Y02T 10/47* (2013.01)

(58) Field of Classification Search
 CPC . Y02T 10/121; Y02T 10/144; F01L 2800/10; F01L 9/02; F02M 25/0779; F02M 25/0795; F02D 41/0077; F02D 41/1446; F15B 2211/6343; F02B 37/18
 USPC ............... 251/129.04, 129.5, 129.08; 60/602, 60/39.76, 273, 605.2
 See application file for complete search history.

(56) References Cited

U.S. PATENT DOCUMENTS

| | | | |
|---|---|---|---|
| 6,871,699 B1 | 3/2005 | Boyd et al. | |
| 7,455,056 B2 * | 11/2008 | Seiyama et al. | 123/568.11 |
| 8,113,184 B2 * | 2/2012 | Seiyama et al. | 123/568.12 |
| 8,146,573 B2 * | 4/2012 | Oohashi et al. | 123/568.21 |

* cited by examiner

*Primary Examiner* — Thomas Denion
*Assistant Examiner* — Thomas Olszewski
(74) *Attorney, Agent, or Firm* — GE Global Patent Operation; John A. Kramer

(57) ABSTRACT

Various methods and systems are provided for a hydraulically actuated engine valve. In one example, a method includes receiving an indication of a temperature of an exhaust flow exceeding a threshold temperature. The method further includes responsive to the indication, increasing a flow, in a hydraulically actuated valve system having a valve and an actuator in thermal communication with the exhaust flow, of hydraulic fluid through the actuator, to manage a temperature of the actuator.

17 Claims, 6 Drawing Sheets

SYSTEMS AND METHODS FOR A HYDRAULICALLY ACTUATED VALVE

FIELD

Embodiments of the subject matter disclosed herein relate to engines with hydraulic systems. Other embodiments relate to valve control in an engine system.

BACKGROUND

Various types of valves may be used to control exhaust flow in turbocharged engines or engines that use exhaust gas recirculation. In some examples, the valves may be hydraulically actuated valves. Under some conditions, engine exhaust temperatures may reach high temperature, such as 700 to 760 degrees Celsius, and a significant amount of heat may be transferred to actuators that control the valves. The actuators may have one or more components, such as oil seals, bearings, and other mechanisms, that may degrade under such high temperatures. As such, in order to cool the actuators, the actuators may be decoupled from the valve and positioned away from the valve, or the actuator may be cooled via water or air cooling, for example. Each of these approaches can have disadvantages. For example, positioning the valve away from the actuator can introduce control errors, dead-bands (due to linkage tolerances), and delay. Similarly, water cooling may result in increased heat rejection requirements of the water cooling system, as well as increased structure and component costs and packaging space.

BRIEF DESCRIPTION

Thus, in one embodiment, an example method includes receiving an indication of a temperature of an exhaust flow exceeding a threshold temperature. The method further includes, responsive to the indication, in a hydraulically actuated valve system having a valve and an actuator in thermal communication with the exhaust flow, increasing a flow through the actuator, to manage a temperature of the actuator. For example, the actuator may modulate the valve with at least an amplitude and at least a frequency. Further, the modulation may include a plurality of frequency and amplitude components to generate various modulations, including sine waves, square waves, triangle waves, and combinations thereof.

By modulating the valve, the flow of fluid through the actuator may be increased at a rate corresponding to the amplitude and frequency of modulation of the valve. In this manner, increased cooling of the actuator of the valve may occur due to the increase of relatively cool hydraulic fluid flowing through the actuator. As such, the valve may be modulated when the exhaust temperature is greater than the threshold temperature, thereby reducing degradation of the actuator and increasing reliability of the actuator. Additionally, even though the valve is modulated, the average exhaust flow through the valve may be maintained within a range of a desired exhaust flow in order to control operating conditions, such as operating conditions of an engine generating the exhaust flow.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for a hydraulically actuated valve coupled in an engine exhaust system. In one example, a method comprises receiving an indication of a temperature of an engine exhaust flow exceeding a threshold temperature. The method further comprises, responsive to the indication, increasing a flow, in a hydraulically actuated valve system having a valve and an actuator in thermal communication with the exhaust flow, of hydraulic fluid through the actuator, to manage a temperature of the actuator. ("Manage" may refer to at least seeking to keep the temperature below damaging levels.) Increasing the flow of hydraulic fluid through the actuator may include inducing a modulation of the valve, while still maintaining the amount of exhaust flow through the valve within a desired range. For example, the valve may be modulated with at least an amplitude and at least a frequency, which may be determined based on operating conditions of the system, such as engine speed, engine firing frequency, position of the valve with respect to end stops, and the like. In one embodiment, the modulation may include a relatively small amplitude, but relatively high frequency, sometimes referred to as a dither. By increasing the flow of fluid to the actuator when the exhaust temperature is greater than the threshold temperature, cooling of the actuator may occur such that degradation of the actuator may be reduced and reliability of the actuator may be increased, while still retaining control of the amount of exhaust flow through the valve at a bandwidth below the modulation frequency.

In one embodiment, the hydraulically actuated valve may be coupled in an exhaust system of an engine in a vehicle. In some embodiments, a locomotive system may be used to exemplify one of the types of vehicles having engines with exhaust systems to which the valve may be attached. Other types of vehicles may include on-highway vehicles and off-highway vehicles other than locomotives or other rail vehicles, such as mining equipment and marine vessels. Other embodiments of the invention may be used for valves that are coupled to exhaust systems of stationary engines. The engine may be a diesel engine, or may combust another fuel or combination of fuels. Such alternative fuels or combinations of fuels may include gasoline, kerosene, biodiesel, natural gas, and/or ethanol. Suitable engines may use compression ignition and/or spark ignition.

Figure 1:
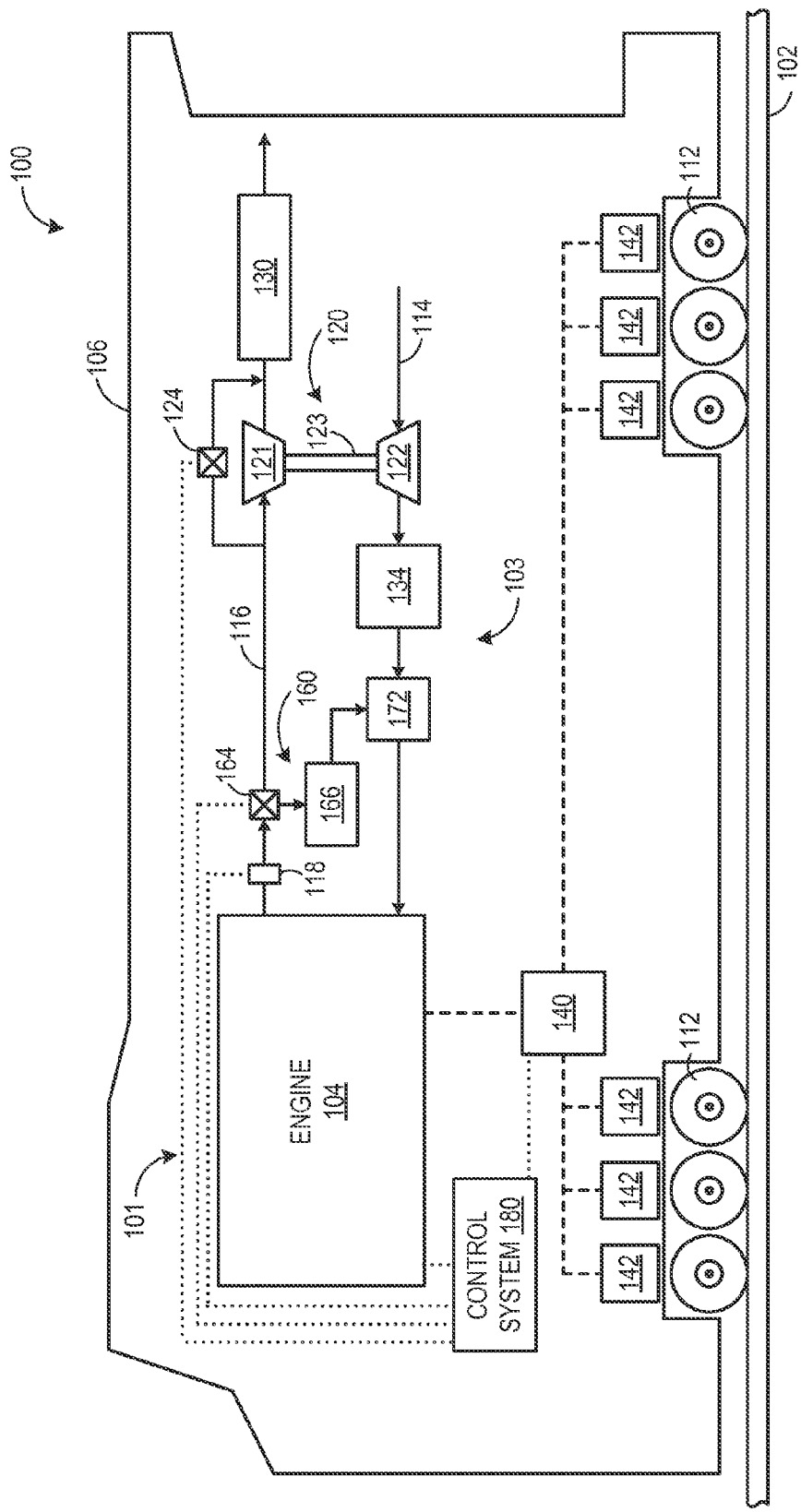
FIG. 1 shows a schematic diagram of an engine system.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system 101 with an engine 104, such as an internal combustion engine.

The engine 104 receives intake air for combustion from an intake, such as an intake passage 114. The intake may be any suitable conduit or conduits through which gases flow to enter the engine. The intake passage 114 receives ambient air from an air filter (not shown) that filters air from outside of a vehicle 106 in which the engine 104 is positioned. Exhaust gas resulting from combustion in the engine 104 is supplied to an exhaust, such as exhaust passage 116. The exhaust may be any suitable conduit through which gases flow from the engine. Exhaust gas flows through the exhaust passage 116 to an exhaust stack (not shown) and to atmosphere, for example.

As depicted in FIG. 1, the engine system includes an exhaust gas recirculation (EGR) system 160, which routes exhaust gas from the engine 104 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$), for example. The EGR system 160 includes an EGR valve 164 operable to control a flow of exhaust gas from the engine 104 to the exhaust passage 116 and intake passage 114. The EGR valve 164 may be a hydraulically actuated valve, for example, such as a three-way valve, a butterfly valve, or the like. In other examples, the EGR valve 164 may be an on/off valve or may control a variable amount of EGR. As depicted in the exemplary embodiment shown in FIG. 1, the EGR system 160 further includes a heat exchanger such as an EGR cooler 166 to reduce a temperature of (e.g., cool) the exhaust gas before the exhaust gas returns to the intake passage 114. The EGR cooler 166 may be an air-to-liquid heat exchanger, for example. In such an example, one or more charge air coolers 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass (not shown).

As shown in FIG. 1, the engine system 101 further includes an EGR mixer 172 which mixes the recirculated exhaust gas with charge air such that the exhaust gas may be evenly distributed within the charge air and exhaust gas mixture. In the exemplary embodiment depicted in FIG. 1, the EGR system 160 is a high-pressure EGR system which routes exhaust gas from a location upstream of a turbocharger 120 in the exhaust passage 116 to a location downstream of the turbocharger 120 in the intake passage 114. In other embodiments, the engine system 101 may additionally or alternatively include a low-pressure EGR system which routes exhaust gas from downstream of the turbochargers 120 in the exhaust passage 116 to a location upstream of the turbocharger 120 in the intake passage 114.

As depicted in FIG. 1, the engine system 101 further includes the turbocharger 120 arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 includes a turbine 121 and a compressor 122 which are mechanically coupled via a shaft 123. In the exemplary embodiment shown in FIG. 1, the turbocharger 120 is provided with a wastegate 124, which is controllable for selectively bypassing exhaust gas around the turbocharger 120. (Wastegate refers to a valve or other element that is controllable for this purpose.) In some examples, the wastegate 124 may be a hydraulically actuated valve. The wastegate 124 may be opened, for example, to divert the exhaust gas flow away from the turbine 121. In this manner, the rotating speed of the compressor 122, and thus the boost provided by the turbocharger 120 to the engine 104 may be regulated during steady state conditions. In other embodiments, the engine system 101 may include a two-stage turbocharger with a first turbocharger operating at a relatively higher pressure and a second turbocharger operating at a relatively lower pressure. In such an example, each of the turbochargers may be provided with a wastegate, or only the first or second turbocharger may be provided with a wastegate.

Further, as depicted in FIG. 1, the engine system 101 includes a generator 140 which is mechanically coupled to the engine 104. For example, the engine 104 is a diesel engine that generates a torque output that is transmitted to the generator 140. The generator 140 produces electrical power that may be stored and applied for subsequent propagation to a variety of downstream electrical components. As an example, the generator 140 may be electrically coupled to a plurality of traction motors 142 coupled to each of the wheels 112 of the vehicle 106, and the generator 140 may provide electrical power to the plurality of traction motors 142. As depicted, the plurality of fraction motors 142 are each connected to one of a plurality of wheels 112 to provide tractive power to propel the rail vehicle 106.

Valves in the exhaust system 103, such as the EGR valve 164 and the wastegate 124 may be fluidly coupled to a hydraulic system. In some embodiments, the hydraulic system may be pressurized by a pump coupled to a crankshaft of the engine 104. In other embodiments, the hydraulic system may be pressurized by an electrically driven pump. For example, the electrically driven pump may receive power from the generator 140 or another power source, such as an auxiliary alternator. By pressurizing the hydraulic system via an electrically driven pump instead of a crankshaft driven pump, the hydraulic system may remain pressurized under conditions when the engine is not operating. As such, cooling of valves such as the EGR valve 164, the wastegate 124, and/or other valves coupled in the engine system 101 may be carried out when the engine is not operating. For example, cooling of the valves may occur during a heat soak after engine shutdown. During a heat soak, a temperature of the engine components, such as one or more valves, may increase for a duration after the engine is shut down as the flow of cooling medium (e.g., the hydraulic fluid actuating the valve) is abruptly stopped, yet significant heat is still present from the immediately preceding operation.

The engine system 101 further includes an exhaust treatment system 130 coupled in the exhaust passage in order to reduce regulated emissions. As depicted in FIG. 1, the exhaust gas treatment system 130 is disposed downstream of the turbine 121 of the turbocharger 120. In other embodiments, an exhaust gas treatment system may be additionally or alternatively disposed upstream of the turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 further includes a control system 180 which is provided and configured to control various components related to the vehicle system 100. In one example, the control system 180 includes a computer control system. The control system 180 further includes non-transitory, computer readable storage media (not shown) including code for enabling on-board monitoring and control of engine operation. The control system 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control system 180 may receive signals from various engine sensors including, but not limited to, engine speed, engine load, boost pressure, ambient pressure, exhaust temperature 118, exhaust pressure, etc. Correspondingly, the control system may control the vehicle system 100 by sending commands to various components such as the generator 140, the wastegate 124, the EGR valve 164, other valves or flow control elements, etc.

As an example, the control system 180 may receive signals from an exhaust temperature sensor 118 indicating the exhaust temperature. The control system 180 may control the EGR valve 164 or the wastegate 124 based on the exhaust temperature. For example, in embodiments, when the exhaust temperature exceeds a threshold temperature, the control system 180 may adjust actuation of the EGR valve 164 or the wastegate 124. For example, the valve may be modulated with a square wave at a selected frequency and amplitude. In one embodiment, the valve may be switched between an on position and an off position, with a duty cycle selected to maintain an amount of exhaust flow through the valve with a desired range. Additionally, or alternatively, the valve may be modulated with a smaller amplitude than between an on and off position, for example, from a partly open position to a more partly open position. The frequency of the modulation may be adjusted based on the exhaust temperature, for example, the frequency may be increased based on the exhaust temperature to increase the overall flow of hydraulic through the valve, as will be described in more detail herein. In other embodiment, the valve may be modulated with a frequency and amplitude determined based on various operating parameters, such as engine speed, engine firing frequency, and position of the valve with respect to end stops of the valve.

In an exemplary embodiment, a system comprises a valve with a hydraulic actuator positioned in an exhaust system of an engine, and an exhaust temperature sensor positioned in the exhaust system. The system further comprises a control system operable to receive an indication of an exhaust temperature from the exhaust temperature sensor, and to modulate the valve to increase hydraulic fluid flow through the actuator to control the actuator temperature when the exhaust temperature exceeds a threshold temperature by increasing modulation of the valve above a firing frequency of the engine while on average maintaining the valve at a designated position and flow through the valve at a desired flow value.

Figure 2:
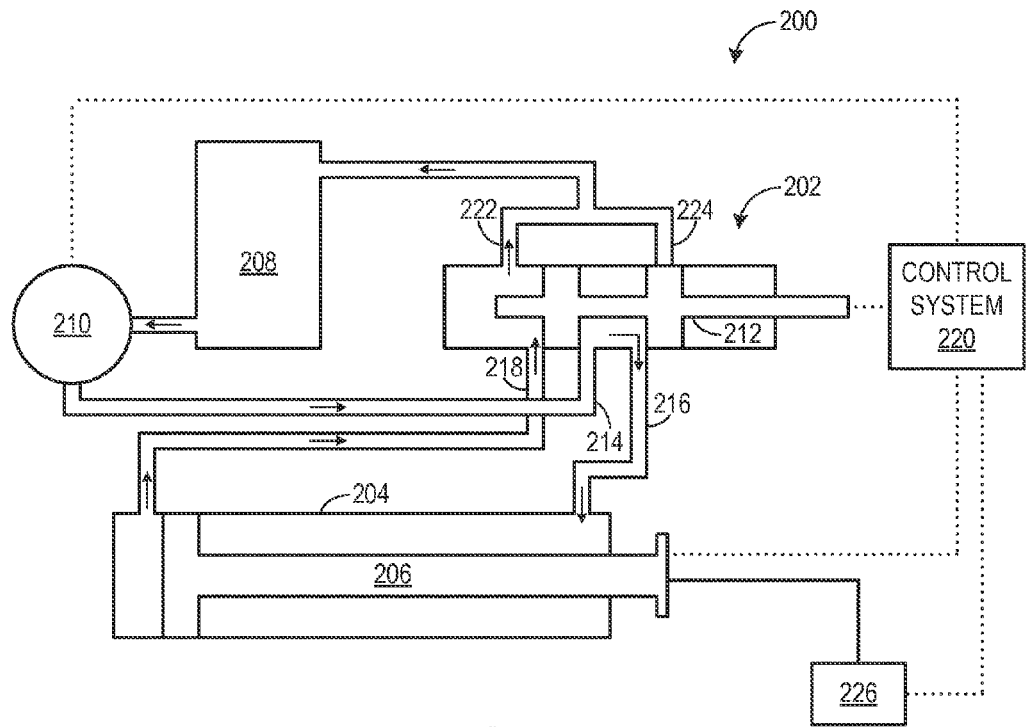
FIGS. 2 and 3 show schematic diagram of a hydraulic actuator.
Figure 3:
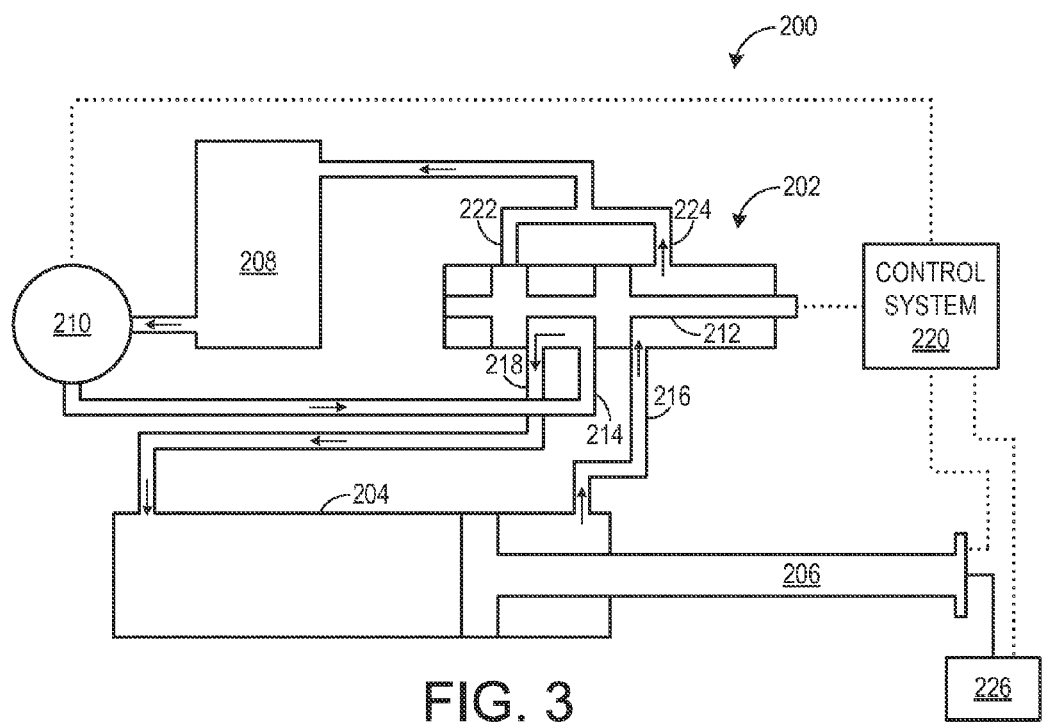

FIGS. 2 and 3 show an example of a hydraulically actuated valve system 200, which includes a spool valve 202 and a hydraulic cylinder 204 and piston 206, which form an actuator to control a position of a valve 226. The valve 226 may control a flow of exhaust, such as the EGR valve 164 or the wastegate 124 described above with reference to FIG. 1. As depicted, FIG. 2 shows the hydraulically actuated valve system 200 in a first position in which the piston 206 is pushed into the hydraulic cylinder 204, and FIG. 3 shows the hydraulically actuated valve system 200 in a second position in which the piston 206 is pushed out of the hydraulic cylinder 204.

As depicted, hydraulic fluid is pumped from a fluid reservoir 208 via a pump 210 to pressurize the valve system 200. A spool 212 of the spool valve 202 may be adjusted to control the flow of hydraulic fluid into the hydraulic cylinder 204, and thus position of the valve 226. For example, in FIG. 2, a control system 220 actuates the spool 212 such that it is in a first position which puts a channel 214 in fluid communication with a channel 216 so that hydraulic fluid flows from the pump 210 to the hydraulic cylinder 204 and pushes the piston 206 into the hydraulic cylinder 204. Further, a channel 218 is opened and in fluid communication with a channel 222 such that the hydraulic fluid can flow out of the hydraulic cylinder 204. In this manner, the piston 206 can be pushed into the hydraulic cylinder 204. In contrast, in FIG. 3, the control system 220 actuates the spool 212 such that it is in a second position which puts the channel 214 in fluid communication with the channel 218 so that hydraulic fluid flows from the pump to the hydraulic cylinder 202 and pushes the piston 206 out of the hydraulic cylinder 204. The channel 216 is opened and in fluid communication with a channel 224 such that hydraulic fluid can flow out of the hydraulic cylinder 204. In this manner, the piston 206 can be pushed out of the hydraulic cylinder 204.

When the control system 220, such as the control system 180 described above with reference to FIG. 1, induces modulation to the valve 226 via the actuator, the spool 212 may be moved relatively at a frequency higher than normal actuation of the valve 226 in controlling the exhaust flow. The spool 212 may be moved between the first position (FIG. 2) and the second position (FIG. 3), causing hydraulic fluid to be cycled through the system. For example, for every cycle of the modulation, an amount of hydraulic fluid corresponding to a volume change of moving the piston to the left and then to the right (e.g., the delta from FIGS. 2 and 3) is cycled through. As such, the faster the valve is moved at a given amplitude (e.g., the higher the frequency of modulation), the more the flow rate of hydraulic fluid cycling through the valve system 200 is increased. Further, as the amplitude of modulation is increased at a given frequency, the volume of hydraulic fluid cycling through the valve system 200 is increased over a given time interval. In this manner, a flow of hydraulic fluid through the spool valve 202 and hydraulic cylinder 204 may be increased, thereby increasing cooling of the spool valve 202 and hydraulic cylinder 204. However, because the modulation is at a frequency above the normal bandwidth of valve actuation in controlling exhaust flow, control of the exhaust flow is still retained. The normal bandwidth of the valve may refer to the frequency range at which it is able to actually affect a change of exhaust flow through the valve, given the volumes of the source and sink of the exhaust gas (e.g., the intake manifold volume and exhaust manifold volume in the case of EGR flow). As a simplified example, if it takes 0.5 seconds for exhaust flow to effectively commence from when the valve is opened, or 0.5 seconds for exhaust flow to effectively stop from when the valve is closed, then the valve may be modulated open and closed (or vice versa), to increase fluid flow through the actuator, several times within 0.4 seconds only (for example).

Figure 4:
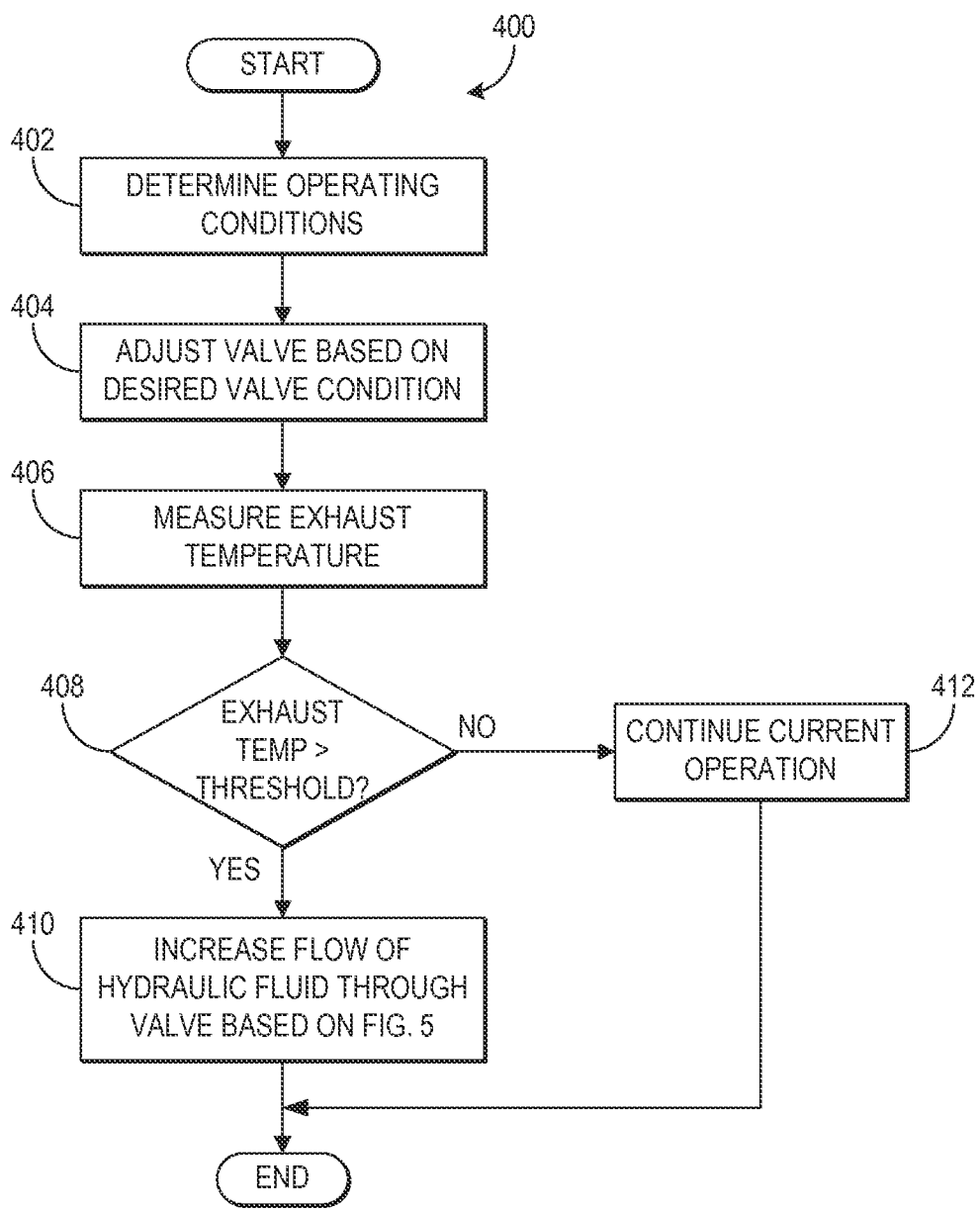
FIG. 4 shows a flow chart illustrating a method for controlling a hydraulically actuated valve.
Figure 5:
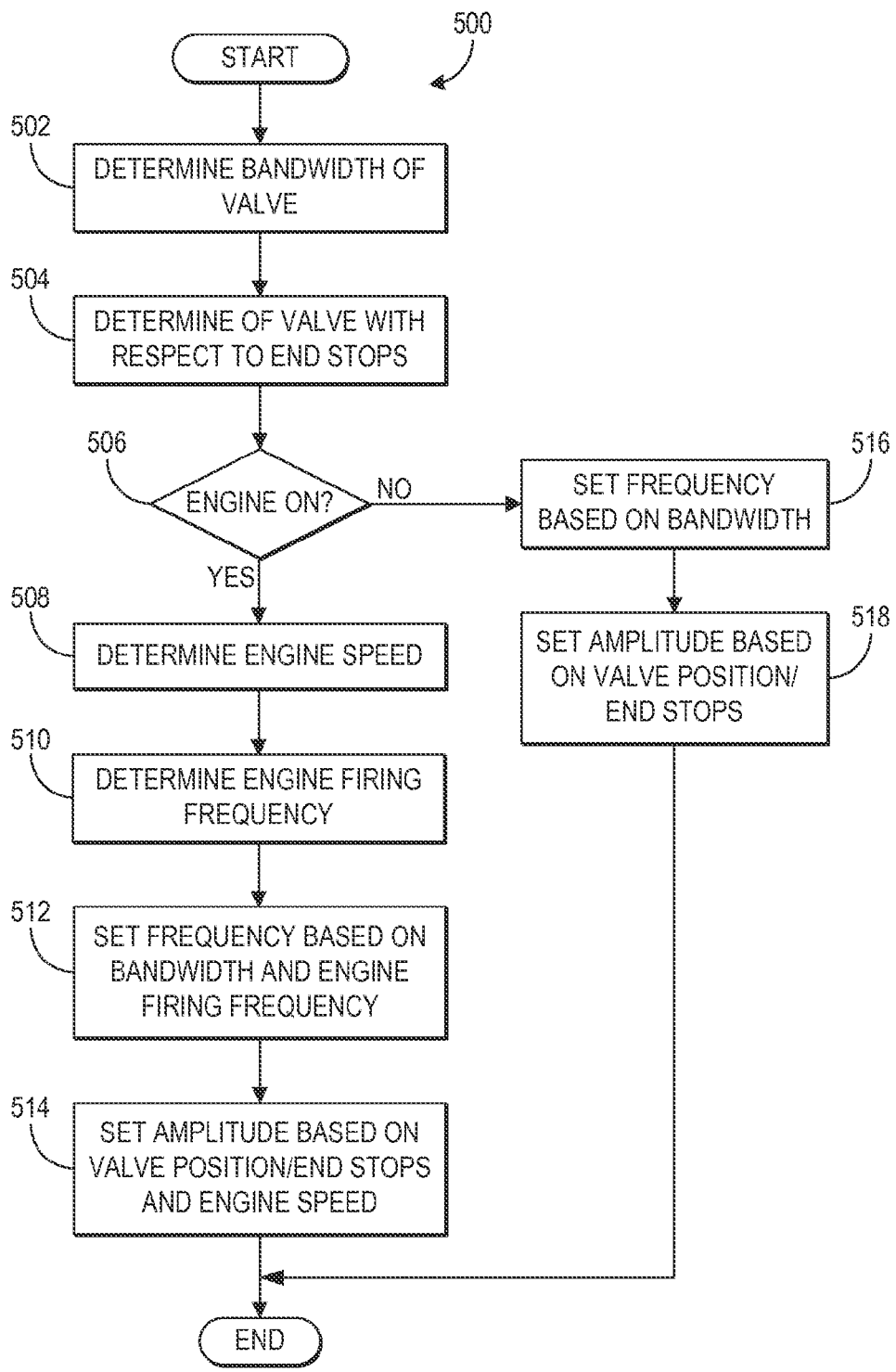
FIG. 5 shows a flow chart illustrating a method for determining a frequency and amplitude of modulation of a hydraulically actuated valve.

An embodiment relates to a method (e.g., a method for a hydraulically actuated valve). The method comprises estimating an exhaust flow temperature at a location in an exhaust stream via an exhaust temperature sensor disposed at another location in an engine exhaust system. The method further comprises modulating a hydraulically actuated valve to increase a flow of hydraulic fluid through an actuator of the valve, while maintaining a flow of exhaust through the valve, when the exhaust temperature exceeds a threshold temperature. An example of another embodiment of a method is shown in the flow charts of FIGS. 4 and 5. FIG. 4 shows a flow chart illustrating a method for controlling a hydraulically actuated valve, such as the EGR valve 164 or wastegate 124 described above with reference to FIG. 1. FIG. 5 shows a flow chart illustrating a method for determining a frequency and amplitude of modulation of the hydraulically actuated valve. The frequency and amplitude determined via the method shown in FIG. 5 may be used to control the valve via the method shown in FIG. 4, for example. (Valve refers to a device that is controllable to vary flow of a fluid through a passage or otherwise from one location to another. For example, a valve may be controllable to vary flow from zero/no flow, such as when the valve is fully closed, to 100% flow, such as when the valve is fully open. Hydraulically actuated valve refers to a valve that is controllable via application of a hydraulic fluid to a control input of the valve.)

Continuing to FIG. 4, a method 400 for controlling a hydraulically actuated valve is shown. Specifically, the method determines operating conditions including an exhaust gas temperature, and adjusts an actuator of the valve based on the operating conditions. For example, when the exhaust gas temperature is greater than a threshold temperature, the actuator is adjusted such that there is a greater flow of fluid, such as hydraulic fluid, through the actuator.

At step 402, operating conditions are determined. As non-limiting examples, the operating conditions may include engine speed, engine load, exhaust temperature, ambient temperature, or the like.

Once the operating conditions are determined, the valve is adjusted based on a desired valve condition or position at step 404. For example, when the valve is an EGR valve, the valve may be adjusted based on a desired amount of EGR (e.g., adjusted to be more open when more EGR is desired or adjusted to be more closed when less EGR is desired). As another example, when the valve is a turbocharger wastegate, the valve may be adjusted based on a desired level of boost (e.g., adjusted to be more open when less boost is desired or adjusted to be more closed when more boost is desired).

As yet another example, in the exemplary embodiment shown in FIG. 1, during startup, the air fuel ratio (AFR) of the engine needs to be higher than in some other modes of operation, so EGR is usually not used. For doing so, the EGR valve 164 is closed such that flow is not allowed through the EGR system 160. When running at cold temperatures or low loads, in embodiments, EGR is not used or only used sparingly, so the EGR valve 164 would be closed or partially open, for example. When running at steady state load points, specific amounts of EGR may be needed to meet emissions requirements, so the EGR valve 164 will be set to whichever position, partially open or fully open, will provide the correct amount of EGR flow for meeting emissions requirements. Thus, the valve may be adjusted to a position for a desired amount of EGR.

At step 406, the exhaust flow temperature is measured or estimated. In one example, the exhaust flow temperature may be measured by an exhaust temperature sensor, such as the exhaust temperature sensor 118 described above with reference to FIG. 1.

At step 408, it is determined if the exhaust temperature is greater than a threshold temperature. In some examples, the threshold temperature may be based on components of the actuator. For example, the threshold temperature may be a predetermined amount less than a temperature at which degradation of one or more components of the actuator may degrade due to high temperatures.

If it is determined that the exhaust temperature is not greater than the threshold temperature, the method moves to step 412 and current operation is continued. For example, the valve is maintained at the desired position determined at step 404 for the current operating conditions.

On the other hand, if it is determined that the exhaust temperature is greater than the threshold temperature, the method proceeds to step 410 and the flow of fluid through the actuator of the valve is increased based on the method shown in FIG. 5. In some examples, the flow of fluid through the valve may be increased while on average maintaining the valve at the designated position determined at step 404. On average implies a mean position at lower frequencies than a firing frequency of the engine is maintained. In one example, a mathematical average could be used, such as a low-pass filtered position of the valve, the mean position, or the like. Thus, the hydraulically actuated valve may be modulated such that cooling of the actuator may occur while maintaining a flow of exhaust through the valve.

In some embodiments, an increase in exhaust flow temperature may be anticipated and the flow of hydraulic fluid through the valve may be proactively increased. As an example, the increase in exhaust flow temperature may be anticipated based on a change in operating conditions, such as a threshold increase in engine load or an engine shut down. When such a condition occurs, fluid flow through the valve may be increased before a temperature of the valve actuator begins to increase. (Proactively, therefore, refers to such an operation, namely, increasing the fluid flow through the valve before a temperature of the valve actuator begins to increase.)

The flow of hydraulic fluid through the valve may be reduced in response to the measured temperature dropping below the threshold temperature.

FIG. 5 shows a method 500 for determining a frequency and amplitude of modulation of the valve. Specifically, the method determines the frequency and amplitude of modulation based on various operating parameters, such as engine firing frequency, engine speed, and end stops of the valve.

At step 502, the bandwidth of the valve is determined. The bandwidth of the valve may be stored in a look-up table by the control system, for example. The valve may be tested during a time when the valve is not in use or after engine shutdown in order to determine the frequency range of the valve.

At step 504, the position of the valve with respect to the end stops of the valve are determined. For example, if the valve is partially open, the valve may be closer to a first end stop than a second end stop. If the valve is open or closed, the valve may be at or within 1 or 2% of the position of the first or second end stop, for example. Depending on the position of the valve with respect to the end stops, a maximum amplitude of oscillation of the valve may change, as will be described in greater detail below.

At step 506, it is determined if the engine is on. Engine on conditions may include conditions in which the engine output shaft is spinning and/or the engine is combusting. In contrast, engine off conditions may include conditions in which the engine output shaft is not spinning and/or the engine is not combusting. For example, when the engine is off, the engine is at rest and ignition does not occur in the cylinders of the engine.

If it is determined that the engine is not on (i.e., the engine is off), the method moves to steps 516 and 518, and the frequency is set based on bandwidth of the valve and the amplitude is set based on the position of the valve with respect to the end stops of the valve. In some examples, a step change may be induced such that the valve is switched between an on and an off position. As such, the amplitude may be set to a maximum amplitude, for example.

On the other hand, if it is determined that the engine is on, the method proceeds to step 508 and the engine speed is determined. As an example, a speed sensor, such as a Hall effect sensor or other speed sensor, may be used to measure the speed of the engine.

At step 510, the engine firing frequency is determined. As one example, the engine firing frequency may be determined based on the engine speed (as determined at step 508) and a number of cylinders of the engine.

Once the engine speed is determined, the frequency of modulation of the valve is set at step 512 based on the bandwidth of the valve and engine firing frequency. The frequency may be set to be greater than the engine firing frequency, but within the bandwidth of the valve. In one example, the frequency may be set to be an order of magnitude above the firing frequency of the engine. For example, the engine may not respond to airflow changes an order of magnitude above the firing frequency at idle.

At step 514, the amplitude of modulation of the valve is set based on the position of the valve with respect to the end stops of the valve and the engine speed. As an example, at lower engine speeds, the amplitude of the valve may be set to be higher than at higher engine speeds. In one example, the amplitude maybe increased when the engine speed is below a threshold engine speed. In another example, the amplitude may be decreased when the engine speed is greater than a threshold engine speed. In contrast, the frequency of the valve may be set to be higher at higher engine speeds than at lower engine speeds. Further, the amplitude may be set such that the valve does not contact the valve stops during oscillation. For example, a valve that is in a closed position may have a smaller amplitude than a valve that is in a partially open position (e.g., in a mid-range position of the valve), as the valve is closer to an end stop when the valve is closed than when the valve is open.

In some examples, modulation of the valve may be based at least in part on donor cylinder operation parameters. For example, the frequency and amplitude of modulation of an EGR valve may be set based on an amount of EGR, as a chance of engine misfire may be increased when the EGR is highly diluted.

Thus, the method includes increasing the frequency of modulation of the valve with increasing engine speed and decreasing the frequency of modulation of the valve with decreasing engine speed. The method further includes reducing an amplitude of modulation of the valve as an opening of the valve approaches a maximum opening and as the opening of the valve approaches a minimum opening, and increasing the amplitude of modulation of the valve in mid-range positions of the valve. According to one aspect, "mid-range" positions means positions between a first point and a second point. The first point is where the amplitude of modulation would first be reduced as the valve approaches the maximum opening. The second point is where the amplitude of modulation would first be reduced as the valve approaches the minimum opening.

Figure 6:
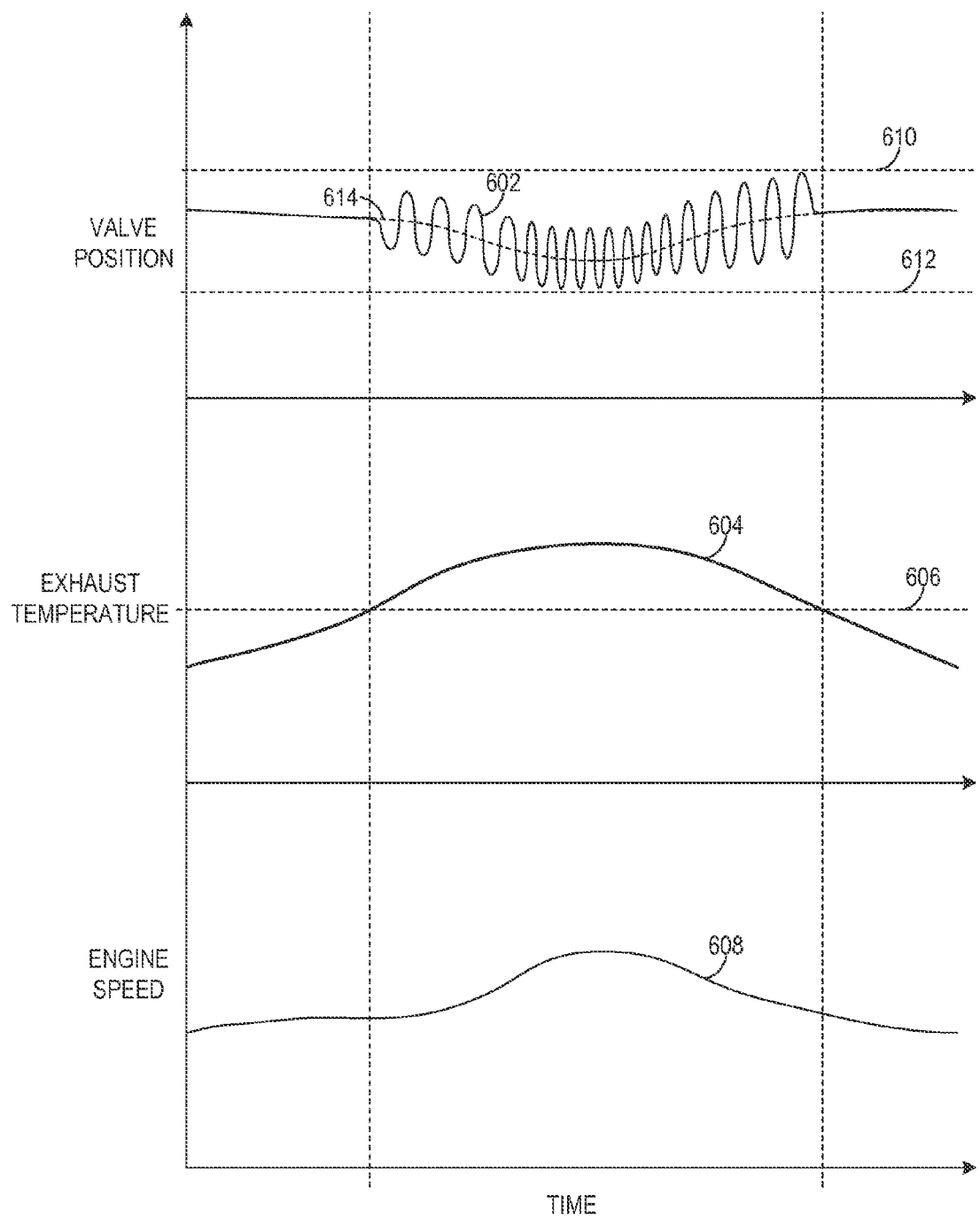
FIG. 6 shows a series of graphs showing valve position with respect to engine temperature and engine speed.

FIG. 6 shows a graph illustrating an example of valve position, exhaust temperature, and engine speed over time. As indicated by curve 602, the valve is modulated with at least a frequency and an amplitude when the exhaust flow temperature (indicated by curve 604) is greater than a threshold temperature 606. Curve 608 indicates the engine speed. As shown, as the engine speed increases, the frequency of modulation of the valve increases and the amplitude of modulation decreases. Further, the amplitude of modulation of the valve is maintained within a first end stop of the valve 610 and a second end stop of the valve 612. Curve 614 shows the desired valve position over time. As shown, the mean position of the valve is maintained such that an average airflow through the valve is maintained.

Thus, the valve may be modulated with at least an amplitude and at least a frequency in order to increase fluid flow through the actuator of the valve when an exhaust temperature is greater than a threshold temperature. The amplitude of modulation of the valve may be based on operating conditions such as engine speed and position of the valve with respect to end stops of the valve. The frequency of modulation of the valve may be based on operating conditions such as bandwidth of the valve and engine firing frequency. When the exhaust temperature is greater than the threshold exhaust temperature, the modulation of the valve is in addition to adjusting the valve based on a desired valve condition, such as desired valve position, desired flow through the valve, or the like. In this manner, cooling of the actuator may occur such that degradation is reduced, while maintaining a flow of gas through the valve at a designated range of flow rate or volume amounts.

Figure 7:
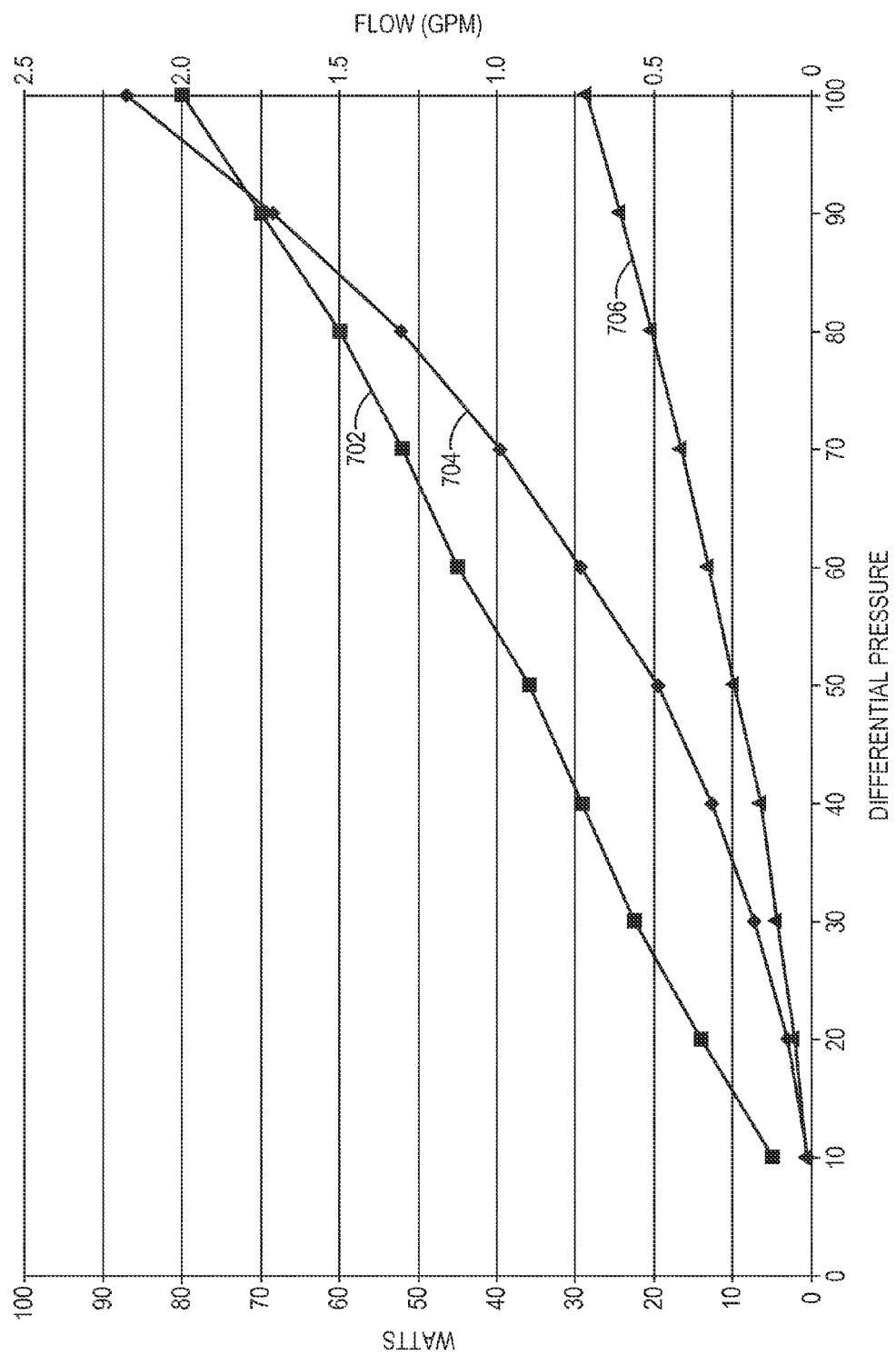
FIG. 7 shows a graph showing hydraulic power consumption.

FIG. 7 shows a graph illustrating hydraulic power consumption. The curve 702 shows a step change flow demand. The curve 704 shows a step change in power. For example, from off to on (e.g., from 0% to 100%) or from on to off (e.g., from 100% to 0%). The curve 706 shows a steady state power. As illustrated by the graph in FIG. 7, there is more flow through the valve as the frequency of modulation increases. As such, greater cooling of the actuator may occur with a greater frequency of modulation of the valve.

In an embodiment, a method (e.g., a method for an engine system with a valve system) comprises receiving information of a temperature associated with an exhaust flow of an engine system. The method further comprises in at least one mode of operation, responsive to the information indicating that the temperature exceeds a threshold temperature, increasing a flow of hydraulic fluid through an actuator operably coupled with a valve of the engine system, to manage a temperature of the actuator. The information may be received from an exhaust temperature sensor of an exhaust system of the engine system. Further, the exhaust temperature sensor may be disposed at a first location in the exhaust system, and the temperature may be estimated at a different, second location in the exhaust system by the exhaust temperature sensor.

In another embodiment, the method may further comprise modulating the valve to increase the flow of the hydraulic fluid through the actuator, while maintaining a flow of exhaust through the valve. In one embodiment, modulating the valve is based at least in part on donor cylinder operation parameters. Additionally, or alternatively, the valve includes adjusting a frequency of modulation and amplitude of modulation of the valve. The modulation may be adjusted, including one or more of increasing the frequency of modulation of the valve with increasing engine speed and decreasing the frequency of modulation of the valve with decreasing engine speed, reducing the amplitude of modulation of the valve as an opening of the valve approaches a maximum opening and as the opening of the valve approaches a minimum opening, and increasing the amplitude of modulation of the valve in mid-range positions of the valve. In another embodiment, the method further comprises increasing the amplitude of modulation of the valve when an engine speed is below a threshold engine speed. Additionally, or alternatively, the method may further comprise decreasing the amplitude of modulation of the valve when an engine speed is greater than a threshold engine speed. Additionally, or alternatively, the method may further comprise adjusting the frequency of modulation of the valve based on an engine firing frequency and a bandwidth of the valve.

In another embodiment, increasing the flow of the hydraulic fluid through the actuator includes modulating the valve with at least an amplitude of modulation and at least a frequency of modulation, wherein the actuator adjusts the valve to provide the modulation. The frequency of modulation of the valve may be greater than an engine firing frequency. Further, the amplitude of modulation of the valve may be based on one or more of end stops of the valve and an engine speed.

In another embodiment, the information is received during a heat soak. In another embodiment, the method further comprises reducing the flow of the hydraulic fluid through the actuator responsive to the temperature dropping below the threshold temperature. In another embodiment, the method further comprises anticipating an increase in temperature of the exhaust flow and proactively increasing the flow of the hydraulic fluid through the actuator. In another embodiment, the valve is an exhaust gas recirculation valve. In another embodiment, the valve is a turbocharger wastegate. In another embodiment, the flow of the hydraulic fluid is increased while maintaining a flow of gas through the valve within a designated range of flow rates.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   via a control system including non-transitory, computer readable storage media including code for enabling on-board monitoring and control of operation of an engine:
   receiving an indication of a temperature of an exhaust flow from the engine from an exhaust temperature sensor; and
   responsive to the temperature of the exhaust flow exceeding a threshold temperature, increasing a flow, in a hydraulically actuated valve system having a valve and an actuator in thermal communication with the exhaust flow, the exhaust flow flowing through the valve, the valve coupled to the actuator, of hydraulic fluid through the actuator, to manage a temperature of the actuator, where the flow of the hydraulic fluid is increased while maintaining a flow of gas through the valve within a designated range of flow rates.

2. The method of claim 1, wherein increasing the flow of the hydraulic fluid through the actuator includes modulating the valve with at least an amplitude of modulation and at least a frequency of modulation, wherein the actuator adjusts the valve to provide the modulation.

3. The method of claim 2, wherein the frequency of modulation of the valve is greater than an engine firing frequency of the engine.

4. The method of claim 2, wherein the amplitude of modulation of the valve is based on a position of the valve relative to end stops of the valve, the amplitude of modulating decreasing as the position of the valve is closer to an end stop at which the valve is closed.

5. The method of claim 2, wherein the amplitude of modulation of the valve is based on an engine speed, the amplitude of modulation increasing when one or more of engine speed is decreasing and engine speed is below a threshold engine speed.

6. The method of claim 1, further comprising increasing the flow of hydraulic fluid through the actuator during a heat soak when the temperature of the exhaust flow exceeds the threshold temperature.

7. The method of claim 1, further comprising reducing the flow of fluid through the actuator responsive to the temperature of the exhaust flow dropping below the threshold temperature.

8. The method of claim 1, further comprising anticipating an increase in temperature of the exhaust flow in response to one or more of a threshold increase in engine load or an engine shut down and proactively increasing the flow of the hydraulic fluid through the actuator.

9. The method of claim 1, wherein the valve is an exhaust gas recirculation valve.

10. A method, comprising:
    via a control system including non-transitory, computer readable storage media including code for enabling on-board monitoring and control of operation of an engine:
    receiving an indication of a temperature of an exhaust flow from the engine from an exhaust temperature sensor; and
    responsive to the temperature of the exhaust flow exceeding a threshold temperature, increasing a flow in a hydraulically actuated valve system having a valve and an actuator in thermal communication with the exhaust flow, the exhaust flow flowing through the valve, the valve coupled to the actuator, of hydraulic fluid through the actuator, to manage a temperature of the actuator, where the valve is a turbocharger wastegate.

11. A method, comprising:
    via a control system including non-transitory, computer readable storage media including code for enabling on-board monitoring and control of operation of an engine:
    receiving an estimate of an exhaust flow temperature at a location in an exhaust stream from the engine in an engine exhaust system from an exhaust temperature sensor disposed at another location in the engine exhaust system; and
    modulating a hydraulically actuated valve with an actuator of the valve to increase a flow of hydraulic fluid through the actuator while maintaining a flow of exhaust through the valve, when the exhaust flow temperature exceeds a threshold temperature.

12. The method of claim 11, wherein modulating the valve includes adjusting a frequency of modulation and amplitude of modulation of the valve.

13. The method of claim 11, wherein modulating the valve is based at least in part on donor cylinder operation parameters including an amount of exhaust gas recirculation (EGR) supplied by donor cylinders, where a frequency and amplitude of modulation of the valve is set based on the amount of exhaust gas recirculation (EGR).

14. The method of claim 12, further comprising increasing the frequency of modulation of the valve with increasing engine speed and decreasing the frequency of modulation of the valve with decreasing engine speed, and further comprising reducing the amplitude of modulation of the valve as an opening of the valve approaches a maximum opening and as the opening of the valve approaches a minimum opening, and increasing the amplitude of modulation of the valve in mid-range positions of the valve.

15. The method of claim 12, further comprising increasing the amplitude of modulation of the valve when an engine speed is below a threshold engine speed.

16. The method of claim 12, further comprising decreasing the amplitude of modulation of the valve when an engine speed is greater than a threshold engine speed.

17. The method of claim 12, further comprising adjusting the frequency of modulation of the valve based on an engine firing frequency of the engine and a bandwidth of the valve, wherein adjusting the frequency of modulation of the valve based on the engine firing frequency and the bandwidth of the valve includes increasing the frequency of modulation above the engine firing frequency but within the bandwidth of the valve.

* * * * *